(12) United States Patent
Mavinkurve et al.

(10) Patent No.: US 8,630,903 B2
(45) Date of Patent: Jan. 14, 2014

(54) PROVIDING A LOCATOR, SUCH AS A URL, FOR TRACKING MULTIPLE TYPES OF USER-ADVERTISEMENT ACTIONS

(75) Inventors: Sanjay G. Mavinkurve, East Palo Alto, CA (US); Steve Miller, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1644 days.

(21) Appl. No.: 11/396,283

(22) Filed: Mar. 31, 2006

(65) Prior Publication Data
US 2007/0233557 A1 Oct. 4, 2007

(51) Int. Cl.
*G06Q 30/00* (2012.01)

(52) U.S. Cl.
USPC ................................................. 705/14.72

(58) Field of Classification Search
None
See application file for complete search history.

(56) References Cited

U.S. PATENT DOCUMENTS

| | | | |
|---|---|---|---|
| 5,812,776 A * | 9/1998 | Gifford | 709/217 |
| 6,516,311 B1 * | 2/2003 | Yacoby et al. | 707/3 |
| 6,839,680 B1 * | 1/2005 | Liu et al. | 705/10 |
| 7,120,235 B2 * | 10/2006 | Altberg et al. | 379/114.13 |
| 2002/0035629 A1 * | 3/2002 | Sullo et al. | 709/225 |
| 2005/0097204 A1 * | 5/2005 | Horowitz et al. | 709/223 |
| 2006/0248110 A1 * | 11/2006 | Lynn et al. | 707/102 |
| 2007/0168252 A1 * | 7/2007 | Tisa | 705/14 |

OTHER PUBLICATIONS

PCT/ISA/220, "Notification of Transmittal of the International Search Report and the Written Opinion of the International Searching Authority, or the Declaration" for PCT/US07/06447, mailed Dec. 11, 2007 (1 pg.).
PCT/ISA/210, "International Search Report" for PCT/US07/06447, mailed Dec. 11, 2007 (3 pgs.).
PCT/ISA/237, "Written Opinion of the International Searching Authority" for PCT/US07/06447, mailed Dec. 11, 2007 (3 pgs.).

* cited by examiner

*Primary Examiner* — Daniel Sorkowitz
(74) *Attorney, Agent, or Firm* — Straub & Pokotylo; John C. Pokotylo

(57) ABSTRACT

Distracting clutter in ads may be reduced, while at the same time permitting various different ways for advertisement audience members to interact with and use ads. This may be done by (a) accepting telephone number information associated with an advertisement, (b) accepting a URL segment, (c) generating a new URL including the URL segment and the telephone number information, and (d) associating the new URL with the advertisement. The new URL might define a location of a document including marketing information, or a location of a document for facilitating on-line commerce. The telephone number information might be a telephone number or extension for a device or facility supporting telephone purchase orders. The ad, including the new URL, may be printed on an offline property.

23 Claims, 5 Drawing Sheets

FIGURE 1

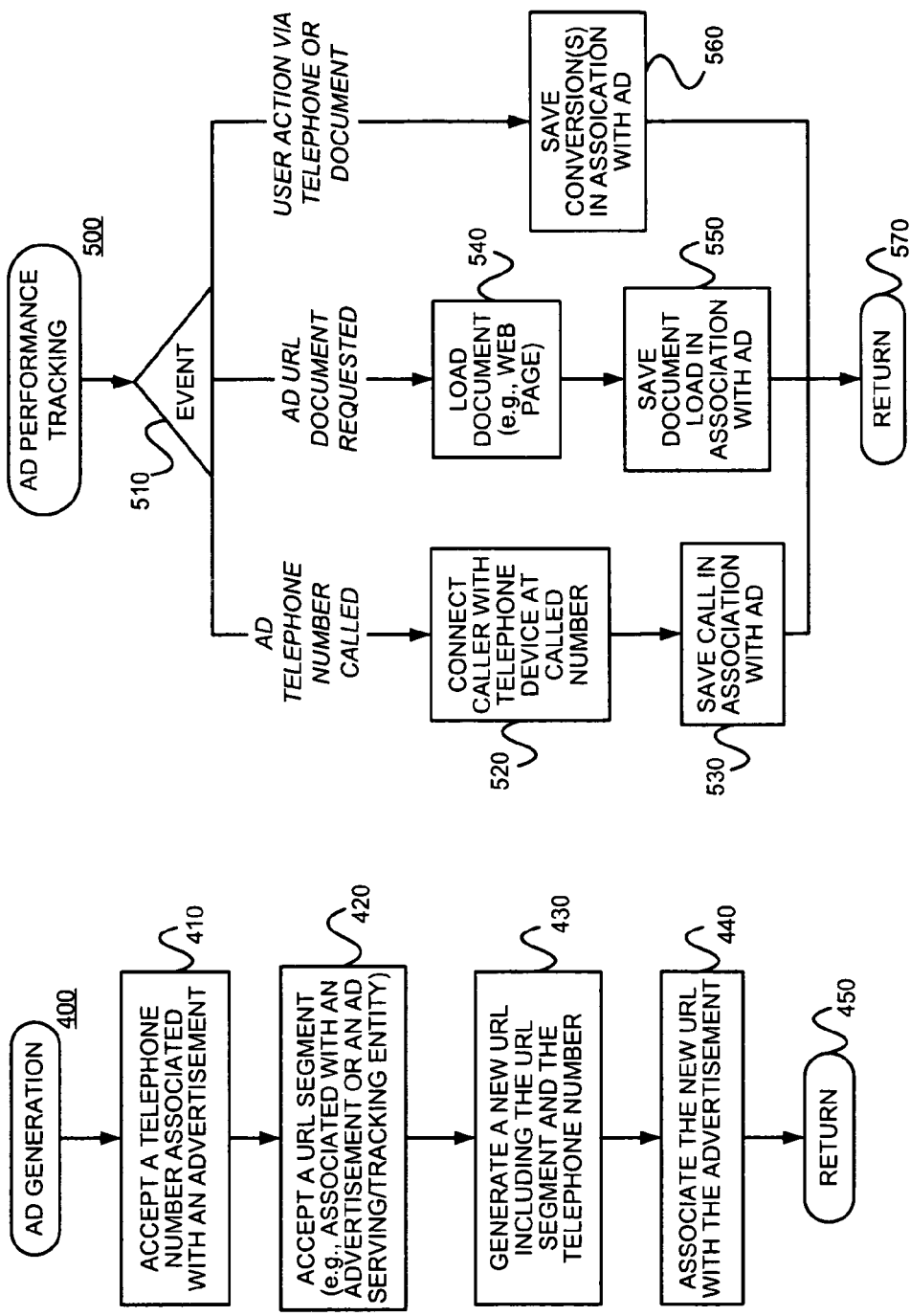
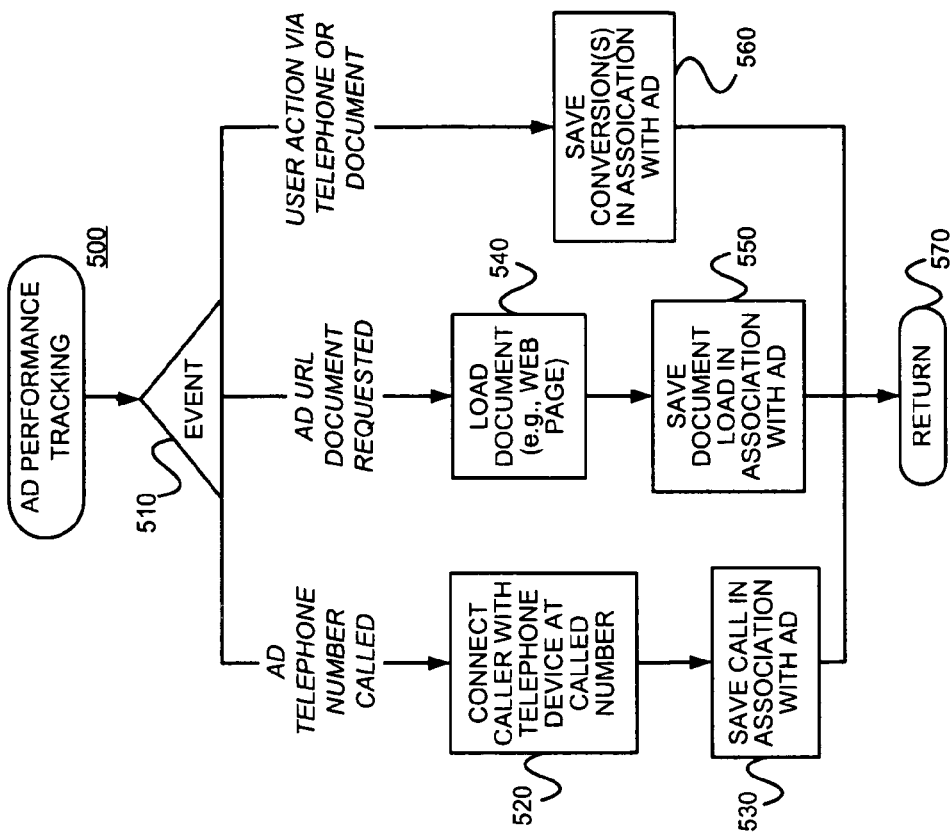

PROVIDING A LOCATOR, SUCH AS A URL, FOR TRACKING MULTIPLE TYPES OF USER-ADVERTISEMENT ACTIONS

§1. BACKGROUND OF THE INVENTION

§1.1 Field of the Invention

The present invention concerns advertising in general, especially advertising on offline properties, such as in print publications for example. In particular, the present invention concerns improving how user-advertisement actions are facilitated and tracked.

§1.2 Background Information

Online advertising has become very popular. One advantage of online advertising is that ads can be better targeted to a perceived user need (e.g., as evidenced by a search query, as evidenced by the content of a Web page being viewed, etc.). In addition to the ability to better target online ads, online ads are also advantageous in that the efficacy of online ads can be tracked using various automated means. For example, if an online ad is selected, such a selection can be tracked. Performance metrics such as selection rate (e.g., the ratio of the number of times an ad is selected to the number of impressions of the ad), conversion rate (e.g., the ratio of the number of times some user action, such as a purchase, a telephone call, etc., occurs with respect to an ad to the number of impressions of the ad) may be tracked.

The efficacy of offline ads and promotions can also be tracked, albeit using more cumbersome, less automated, means. For example, a coupon or ad may include a special telephone number or code which might allow the advertiser to know how the customer received the ad or promotion. For example, U.S. patent application Ser. No. 11/240,793 (referred to as "the '793 application" and incorporated herein by reference), titled "ENTERING ADVERTISEMENT CREATIVES AND BUYING AD SPACE IN OFFLINE PROPERTIES, SUCH AS PRINT PUBLICATIONS FOR EXAMPLE, ONLINE", filed on Sep. 30, 2005 and listing Brian AXE, Steve MILLER, Gokul RAJARAM and Susan WOJCICKI as inventors, describes serving ads in print publications. The ads in the '793 application might include a special telephone number or code to track ad "call-throughs" and/or a special Internet address (URL) to track user responses, etc. FIG. 1 corresponds to FIG. 9 of the '793 application and shows an exemplary display screen 100 for allowing advertisers to enter ad information, such as ad components, in a manner consistent with the present invention. The screen 100 may include an ad preview section 190 for rendering the appearance of an ad, given advertiser inputs. The advertiser may input one or more of (1) an ad headline 110a (rendered as 110b in preview 190), (2) an image file 120a (rendered as 120b in preview 190), (3) descriptive text 130a (to be rendered in area 130b in preview 190), (4) a logo file 140a (to be rendered in area 140b in preview 190), (5) a display URL 150a (to be rendered in area 150b in preview 190), and (6) a telephone number 160a (to be rendered in area 160b in preview 190). The telephone number 160 and/or the URL (e.g., to a server controlled by, or for, the ad network) 170 may be used to generate sales leads, and/or to track user response. The advertiser may also enter an ad name in block 170. The ad information may be saved via save button 180.

While it is useful to provide advertisement audience members with different ways of interacting with and using the ad (e.g., to obtain more information via telephone, to obtain more information over the Internet, to interact with the advertiser via telephone (e.g., to place an order), to interact with the advertiser via the Internet, etc.), providing different contact or address information (e.g., telephone numbers, email addresses, Internet addresses, etc.) can tend to clutter an ad and adversely impact the message conveyed by the ad. The present inventors believe that providing both a telephone number and an Internet address, particularly in a print ad having a small footprint, tends to clutter an ad, such as ads described in the '793 application.

Thus, it would be useful to reduce distracting clutter in ads, while at the same time permitting various different ways for advertisement audience members to interact with and use ads.

§2. SUMMARY OF THE INVENTION

Embodiments consistent with the present invention may reduce distracting clutter in ads, while at the same time permitting various different ways for advertisement audience members to interact with and use ads. Such embodiments may do so by (a) accepting telephone number information associated with an advertisement, (b) accepting a URL segment, (c) generating a new URL including the URL segment and the telephone number information, and (d) associating the new URL with the advertisement.

In at least some embodiments consistent with the present invention, the new URL defines a location of a document including marketing information, or a location of a document for facilitating on-line commerce.

In at least some embodiments consistent with the present invention, the telephone number information might be a telephone number or extension for a device or facility supporting telephone purchase orders.

In at least some embodiments consistent with the present invention, the ad, including the new URL, may be printed on an offline property.

§3. BRIEF DESCRIPTION OF THE DRAWINGS

Figure 1:
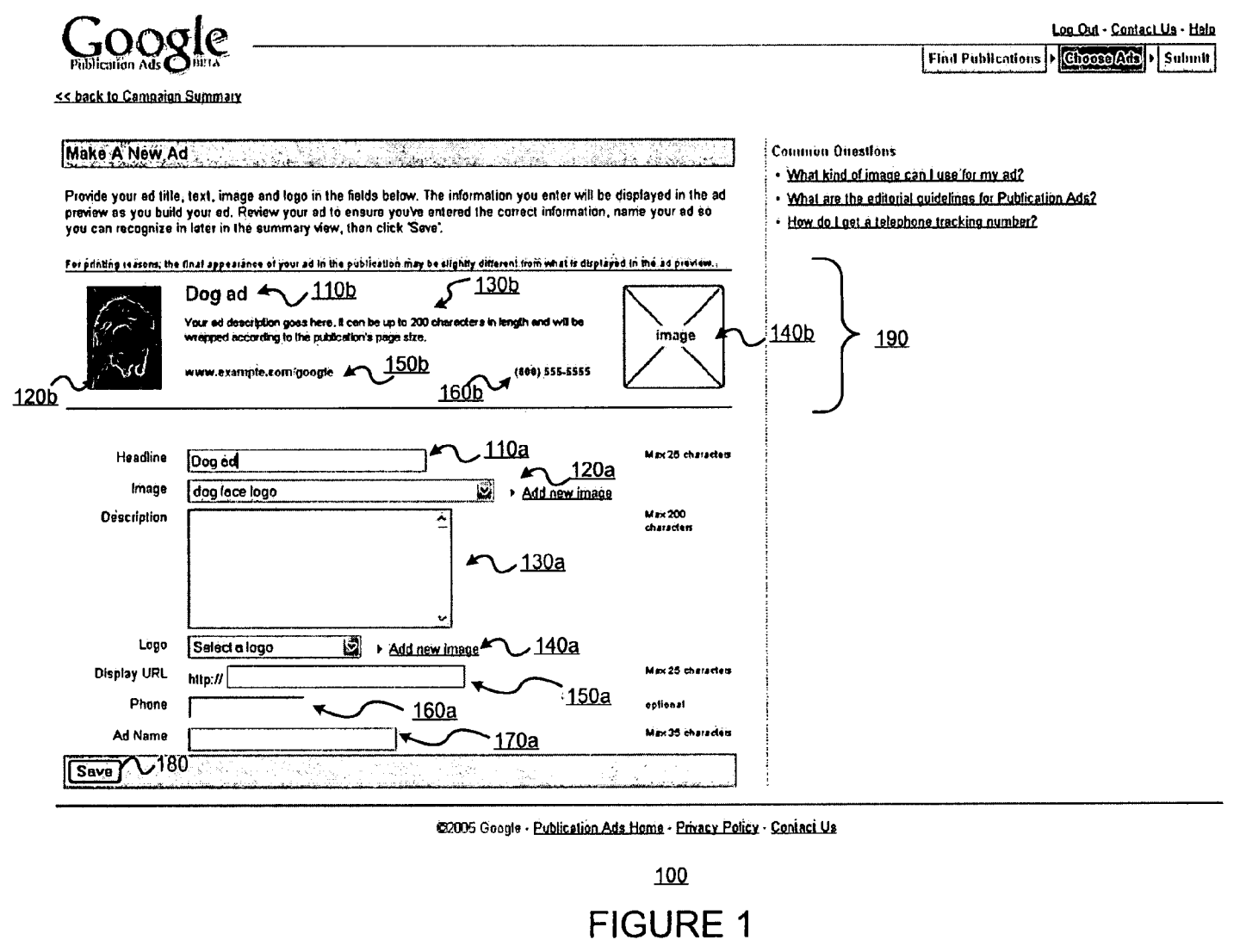

FIG. 1 is an exemplary display screen for allowing advertisers to enter ad information, such as ad components for example, in a manner consistent with the present invention.

FIG. 4 is a flow diagram of an exemplary method for generating ad information in a manner consistent with the present invention.

FIG. 5 is a flow diagram of an exemplary method for tracking ad performance information in a manner consistent with the present invention.

§4. DETAILED DESCRIPTION

Figure 2:
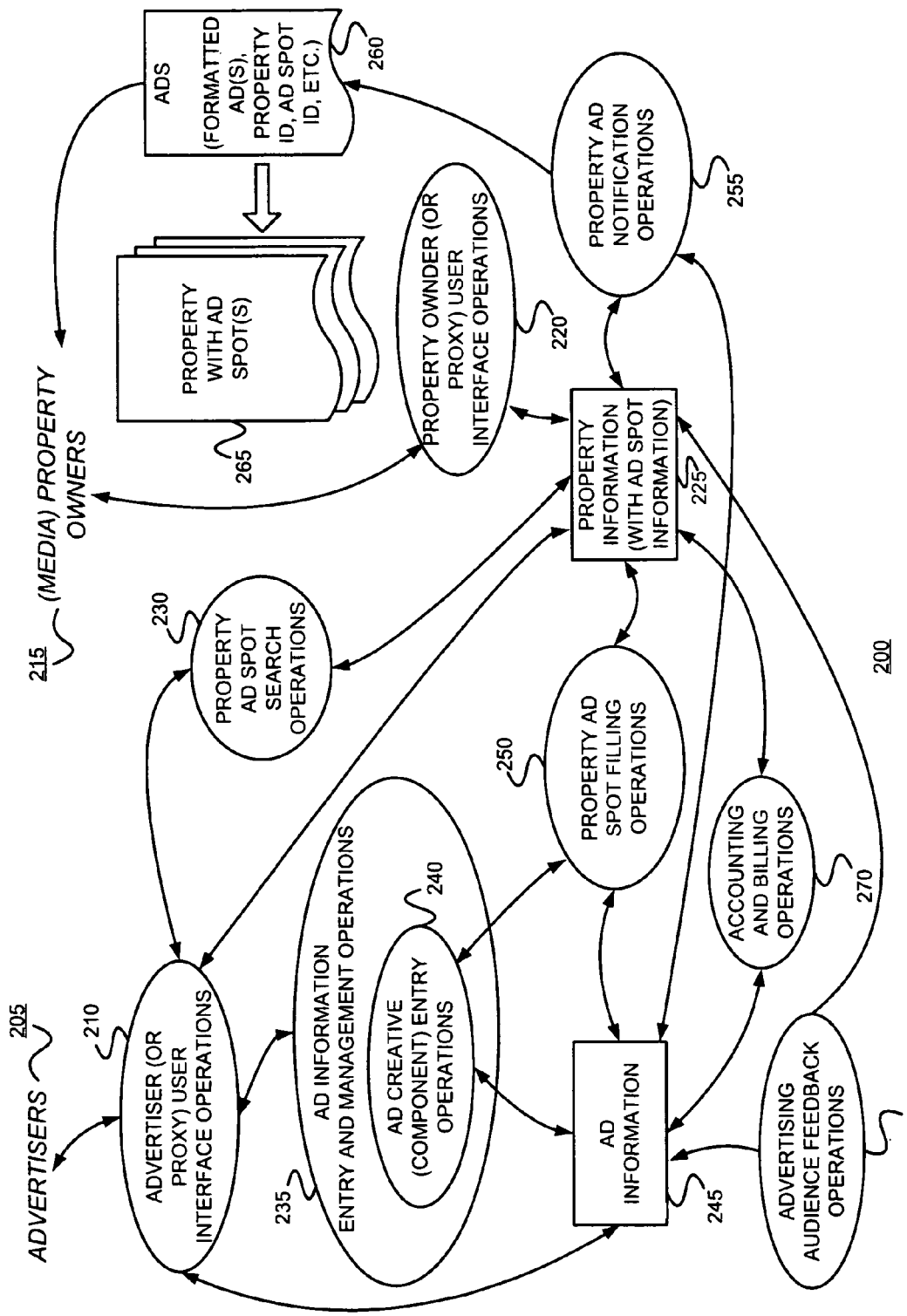
FIG. 2 is an exemplary environment in which, or with which, embodiments consistent with the present invention may be used.

The present invention may involve novel methods, apparatus, message formats, and/or data structures for permitting various different ways for advertisement audience members to interact with and use ads while reducing clutter. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

In the following definitions of terms that may be used in the specification are provided in §4.1. Then, exemplary environments in which embodiments consistent with the present invention may be used are described in §4.2. Thereafter, exemplary embodiments of the present invention are described in §4.3. Finally, some conclusions regarding the present invention are set forth in §4.4.

§4.1 DEFINITIONS

Ads, such as those used in the exemplary embodiments described below, or any other system, may have various intrinsic features. Such features may be specified by an application and/or an advertiser. These features are referred to as "ad features" below. For example, in the case of a text ad, ad features may include a title line, ad text, etc. In the case of an image ad, ad features may include images. Depending on the type of ad, ad features may include one or more of the following: text, images, logos, a special telephone number or code to track ad "call-throughs", a special Internet address (URL) to track user responses, etc.

When an ad is placed, one or more parameters may be used to describe how, when, and/or where the ad was placed. These parameters are referred to as "placement parameters" or "serving parameters" below. Placement parameters may include, for example, one or more of the following: features of (including information on) the property (e.g., printed publication name, issue, volume number, circulation date, etc.) on or in which, or with which, the ad was placed, an absolute position of the ad on the page on which it was placed, a position of the ad relative to other ads placed, an absolute size of the ad, a size of the ad relative to other ads, a color of the ad, a number of other ads placed, types of other ads placed, time of year placed, etc. Naturally, there are other placement parameters that may be used in the context of the invention.

Although placement parameters may be extrinsic to ad features, they may be associated with an ad as placement conditions or constraints in an automated system. When used as placement conditions or constraints, such placement parameters are referred to simply as "placement constraints" (or "targeting criteria"). For example, in some systems, an advertiser may be able to target the placement of its ad by specifying that it is only to be placed on back covers, only as a full page ad, only within an article, only in the months of November and December, etc. As another example, in some systems, an advertiser may specify that its ad is to be placed only if a page or property will include certain keywords or phrases, or includes certain topics or concepts, or falls under a particular cluster or clusters, or some other classification or classifications (e.g., verticals). As yet another example, an advertiser may specify that its ad is to be placed only on properties to be seen by a certain type of user, such as a certain demographic. Finally, in some systems an ad might be targeted so that it is placed in a property to be located in, or delivered to, a particular location.

"Ad information" may include any combination of ad features, ad placement constraints, information derivable from ad features or ad serving constraints (referred to as "ad derived information"), and/or information related to the ad (referred to as "ad related information"), as well as an extension of such information (e.g., information derived from ad related information).

A "offline property" is something on which ads can be presented. An offline property may include offline content (e.g., a newspaper, a magazine, a theatrical production, a concert, a sports event, etc.), and/or offline objects (e.g., a billboard, a stadium score board, and outfield wall, the side of truck trailer, etc.). Offline properties with content (e.g., magazines, newspapers, etc.) may be referred to as "media properties" and those printed may be referred to as "printed publications." Although properties may themselves be offline, pertinent information about a property (e.g., attribute(s), topic(s), concept(s), category(ies), keyword(s), relevancy information, type(s) of ads supported, circulation, rates, audience demographics, location, time of publication, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

"Offline property information" may include any information included in the property, information derivable from information included in the property (referred to as "property derived information"), and/or information related to the property (referred to as "property related information"), as well as an extensions of such information (e.g., information derived from related information). An example of property derived information is a classification based on textual content of a magazine. Examples of property related information include property information from previous issues of a given printed publication.

An "offline property owner" is a person or entity that has some property right in the content of a media property. An offline property owner may be an author of the content. In addition, or alternatively, an offline property owner may have rights to reproduce the content, rights to prepare derivative works of the content, rights to display or perform the content publicly, and/or other proscribed rights in the content. A "publisher" is an example of an offline property owner.

"User information" may include user behavior information and/or user profile information.

A Uniform Resource Locator ("URL") is a string of characters conforming to a standardized format, which refers to a resource on the Internet (e.g., a document or an image) by its location. An HTTP URL, commonly called a "web address", is usually shown in the address bar of a Web browser. URLs are typically classified by their scheme, which typically indicates the network protocol used to retrieve a representation of the identified resource over a computer network. URLs typically conform to a generic syntax, though each scheme can have its own requirements for the syntax of a scheme-specific part of the URL. The generic syntax allows a URL to represent a resource's address, regardless of the original format of the components of the address. Schemes using typical connection-based protocols use a common "generic URI" syntax, which is:

scheme://authority/path?query#fragment

Not all of the portions of the URL are required.

Thus, a URL begins with the name of its scheme, followed by a colon, followed by a scheme-specific part. The "authority" portion of the URL typically consists of the name or IP address of a server, optionally followed by a colon and a TCP port number. It may also contain a username and password for authenticating to the server. The "path" portion of the URL specifies a location in some hierarchical structure, using a slash ("/") as delimiter between components. The "query" portion of the URL typically expresses parameters of a dynamic query to some database residing on the server. Finally, the "fragment" portion of the URL identifies a portion of a resource, often a location in a document. In at least some embodiments consistent with the present invention, the "query" and "fragment" portions of the URL are not needed.

§4.2 EXEMPLARY ENVIRONMENTS IN WHICH, OR WITH WHICH, EMBODIMENTS CONSISTENT WITH THE PRESENT INVENTION MAY BE USED

FIG. 2 is a bubble diagram of an exemplary advertising environment 200 in which, or with which, embodiments consistent with the present invention may be used. FIG. 2 corresponds to FIG. 1 of the '793 application.

Advertisers (or a proxy) 205 may interact with the environment 200 via advertiser user interface operations 210. Print publishers (or more generally, any offline property owners) (or a proxy) 215 may interact with the environment 200 via print publisher user interface operations 220. For example, print publisher 215 many enter publication information 225 via the print publisher user interface operations 220. An advertiser 205 may search at least some of the publication information 225 via advertiser user interface operations 210 and print publication search operations 230. An advertiser 205 may also enter and manage ad information 245 via advertiser user interface operations 210 and ad information entry and management operations 235. For example, an advertiser 205 may enter ad creative information (e.g., components of an ad creative) into the ad information 245 via print ad creative (component) entry operations 240.

Print publication ad spot filling operations 250 may be used to fill available ad spots on offline properties to be published or otherwise released. Such operations 250 may work in one or more of the following ways. First, an advertiser can specify one or more printed publications in which they want their ad(s) to appear. In this scenario, it is possible to take ad spots "off the market" once they are filled by ads. It is also possible accept offers corresponding to ads, and select winning ads at a given time before publication. Second, a publisher can specify one or more ads that it wants to place in its printed publication. In this scenario, it is possible to take ads "off the market" once a budget limit (e.g., specified by an advertiser) for the ad is reached. It is also possible accept offers corresponding to ad spots, and select at a given time before publication, winning ad spots for the ad. Third, available advertisements can be automatically assigned to available ad spots in printed publications. This automated process may involve one or more of (1) finding ads that are relevant to a printed publication or ad spot thereof, (2) if there are more relevant ads than ad spots, arbitrating among competing ads, (3) finding ad spots that are relevant to an ad, and (4) if there are more relevant ad spots than can be paid for due to a budget of the ad, arbitrating among competing ad spots. Arbitration techniques and/or techniques for determining relevant ads from an online advertising environment may be used or adapted to this market for offline property ad spots. Examples of such arbitration techniques are described in U.S. patent application: Ser. No. 10/112,656 (incorporated herein by reference), titled "METHODS AND APPARATUS FOR ORDERING ADVERTISEMENTS BASED ON PERFORMANCE INFORMATION", filed on Mar. 29, 2002, and listing Georges R. Harik, Lawrence E. Page, Jane Manning and Salar Arta Kamangar as inventors; Ser. No. 10/112,654 (incorporated herein by reference), titled "METHODS AND APPARATUS FOR ORDERING ADVERTISEMENTS BASED ON PERFORMANCE INFORMATION AND PRICE INFORMATION", filed on Mar. 29, 2002, and listing Salar Arta Kamangar, Ross Koningstein and Eric Veach as inventors; Ser. No. 10/314,427 (incorporated herein by reference), titled "METHODS AND APPARATUS FOR SERVING RELEVANT ADVERTISEMENTS", filed on Dec. 6, 2002, and listing Jeffrey A. Dean, Georges R. Harik and Paul Buchheit as inventors; Ser. No. 10/375,900 (incorporated herein by reference), titled "SERVING ADVERTISEMENTS BASED ON CONTENT", filed on Feb. 26, 2003, and listing Darrell Anderson, Paul Buchheit, Alexander Paul Carobus, Yingwei Cui, Jeffrey A. Dean, Georges R. Harik, Deepak Jindal and Narayanan Shivakumar as inventors and Ser. No. 10/634,501 (incorporated herein by reference), titled "SERVING CONTENT-RELEVANT ADVERTISEMENTS WITH CLIENT-SIDE DEVICE SUPPORT", filed on Aug. 5, 2003, and listing Darrell Anderson, Paul Buchheit, Jeffrey A. Dean, Georges R. Harik, Carl Laurence Gonsalves, Noam Shazeer and Narayanan Shivakumar as inventors.

The publication information 225 may be updated to identify ads that have been determined to be placed in ad spots of upcoming print publications, and/or the ad information 245 may be updated to identify ad spots in which given ads are to be placed. In any event, print publication notification operations 255 may provide ads 260 to the print publishers so that such ads 260 may be placed in print publications 265. The ads 260 may include one or more formatted ads, a publication identifier, an ad spot identifier, etc.

Accounting and billing operations 270 may be used to assess charges to advertiser 205, and/or to track and/or make payments to print publishers 215.

As will be appreciated by those skilled in the art, embodiments consistent with the present invention may be used in or with various other environments.

4.3 EXEMPLARY EMBODIMENTS CONSISTENT WITH THE PRESENT INVENTION

Figure 3:
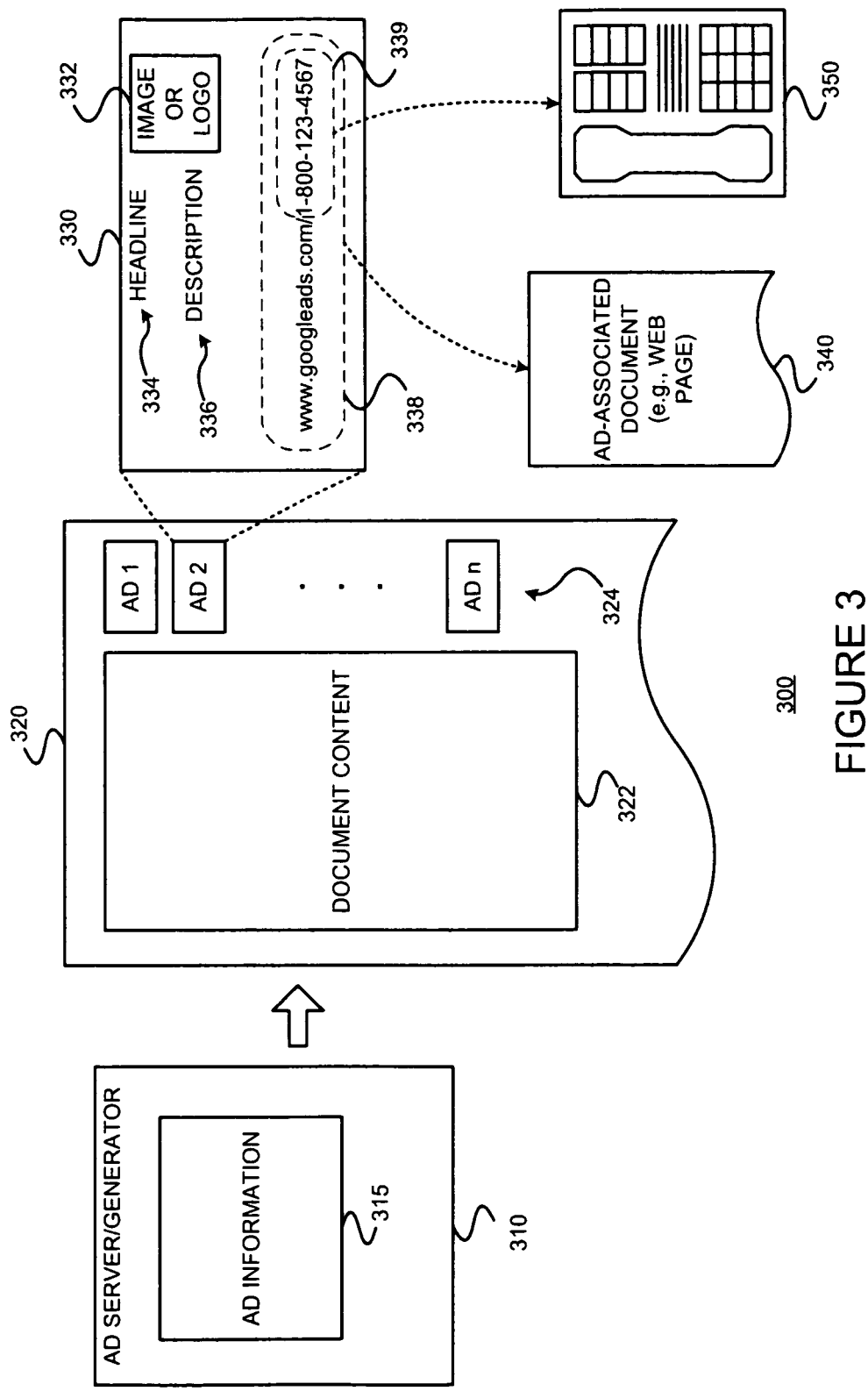
FIG. 3 illustrates an example of operations in an exemplary embodiment consistent with the present invention.

FIG. 3 illustrates operations of an exemplary embodiment consistent with the present invention. A document 320 includes a set of one or more ads 324 and might include document content 322. At least one of the ad(s) 324 might have been generated by ad server/generator 310 using ad information 315. As shown, at least one of the ad(s) 324 might have exemplary format 330. The exemplary ad format 330 might include an image or logo 332, a headline portion 334, a description portion 336 and a URL portion 338. As shown, the URL might include a telephone number 339 as a part of its path. The telephone number 339 might follow a slash "/" character. Although not shown, the telephone number 339 might be followed by further path information and/or fragment information. In at least some embodiments consistent with the present invention, the telephone number might be followed by nothing. In at least some other embodiments consistent with the present invention, the telephone number might be immediately followed by a slash "/", or by a period ".".

The URL 338 defines the location of an ad-associated document (e.g., a Web page) 340. The telephone number portion 339 of the URL 338 provides a number for reaching an ad-associated telephone device 350. The URL 338 might be generated using ad information 315. For example, the ad information 315 might include an advertiser identifier, a telephone number, ad creative content (e.g., a headline, description, image or logo, etc.), an ad landing page, etc. As another example, the ad information 315 might include at least some of the ad information described in the '793 application.

The ad-associated document 340 might be hosted or managed by an entity associated with an ad serving facility or ad performance tracking facility (referred to generally as a "serving/tracking entity") (not shown). Alternatively, the URL 339 might be processed by (e.g., pass through) a serving/tracking entity (not shown). In this way, ad-associated document 340 loads and/or user interactions with ad-associated documents 340 can be tracked.

The ad-associated telephone device 350 might be hosted or managed by a serving/tracking entity (not shown). Alternatively, the telephone number 339 of the ad-associated telephone device 350 might be processed by (e.g., connection established) a serving/tracking entity (not shown). In this way, calls to ad-associated telephone devices 350 and/or user interactions with ad-associated telephone devices 350 can be tracked. For example, the telephone number 339 displayed in the ad 330 might "forward" the call, through a serving/tracking entity, to a retailer instead of showing the retailer's actual number.

An ad serving/tracking entity may manage telephone calls to ad-associated telephone devices for a plurality of different ads of a plurality of different advertisers. An ad serving/tracking entity may manage the serving of ad-associated documents for a plurality of different ads of a plurality of different advertisers. Finally, an ad serving/tracking entity may track the performance of a plurality of different ads of a plurality of different advertisers.

Referring to exemplary ad format 330, ads consistent with the present invention might include more or less information, but should include the URL 338.

4.3.1 Exemplary Methods

The document 320 might be a printed publication, a page of a printed publication, etc. The document 320 might have content 322 in addition to the one or more ads, but need not include content 322. In at least some embodiments consistent with the present invention, the document may be an online document, such as a Web page. In at least some embodiments consistent with the present invention, the ad(s) 324 is rendered on some other type of offline property (e.g., a billboard, a banner, etc.).

FIG. 4 is a flow diagram of an exemplary method 400 for generating ad information in a manner consistent with the present invention. A telephone number associated with an ad is accepted (Block 410) and a URL segment is accepted (Block 420). A new URL including the URL segment and the telephone number is generated. (Block 430) Finally, the new URL is associated with the advertisement (Block 440 before the method 500 is left (Node 450).

FIG. 5 is a flow diagram of an exemplary method 500 for tracking ad performance information in a manner consistent with the present invention. As indicated by event block 510, various branches of the method 500 might be performed in response to the occurrence of various events. For example, if an ad telephone number 339 is called, the calling party is connected with the ad-associated telephone device at the called number (Block 520) and the fact that a call occurred (and perhaps other parameters of the call such as time, date, duration, etc.) is saved in association with the ad (Block 530).

Referring back to event block 510, if an ad URL document is requested, the ad-associated document 540 is loaded (e.g., a Web page is loaded into a browser) (Block 540) and the fact that a document load occurred (and perhaps other parameters of the load such as time, date, etc.) is saved in association with the ad (Block 550).

Finally, referring back to event block 510, if the user performs an action (or a specific type of action) via the ad-associated telephone device or the ad-associated document, this action may be saved in association with the ad. (Block 560) The user action might be a purchase, navigating to a particular Web page or level of a Website, navigating to a particular voice message or level of a voice message system, etc.

As can be appreciated, the method 500 of FIG. 5 permits some indicators of ad performance (e.g., selections, conversions, calls, etc.) to be tracked. In at least some embodiments consistent with the present invention, advertisers might be assessed charges as a function of one or more such ad performance indicators. In at least some embodiments consistent with the present invention, otherwise eligible ads competing for a particular ad spot might be scored using one or more of such ad performance indictors.

4.3.2 Exemplary Apparatus

Figure 6:
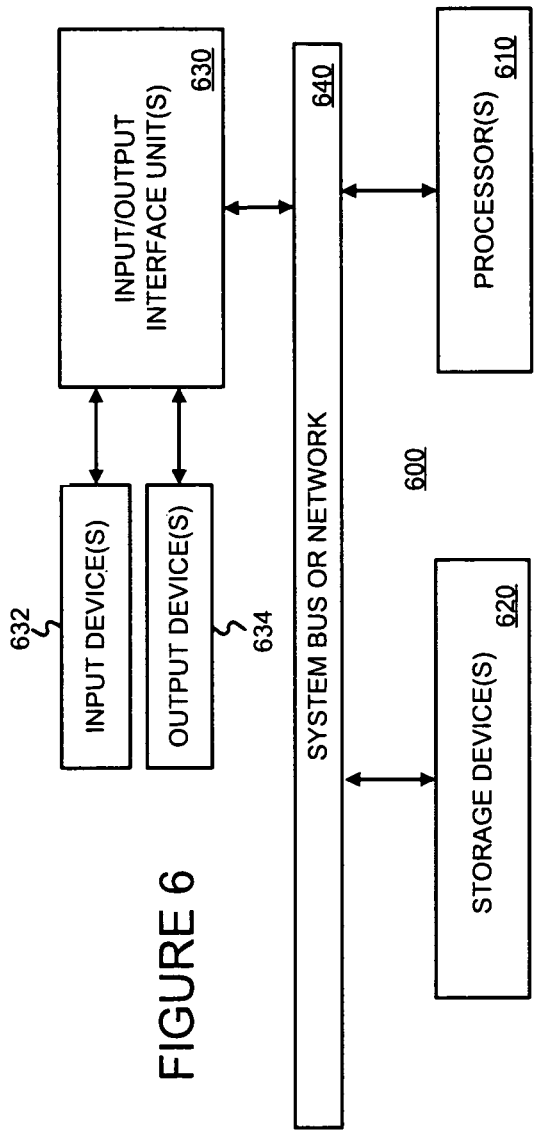
FIG. 6 is a block diagram of apparatus that may be used to perform at least some operations, and store at least some information, in a manner consistent with the present invention.

FIG. 6 is a block diagram of apparatus 600 that may be used to perform at least some operations, and store at least some information, in a manner consistent with the present invention. The apparatus 600 basically includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 620 and/or may be received from an external source via one or more input interface units 630.

In one embodiment, the machine 600 may be one or more conventional personal computers. In this case, the processing units 610 may be one or more microprocessors. The bus 640 may include a system bus. The storage devices 620 may include system memory, such as read only memory (ROM) and/or random access memory (RAM). The storage devices 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively)

be included. These and other input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers and printers for example.

The operations described above may be performed on one or more computers. Such computers may communicate with each other via one or more networks, such as the Internet for example.

§4.3.3 Refinements and Alternatives

Although many of the exemplary embodiments consistent with the present invention were described above in the context of printed publications, other embodiments consistent with the present invention may be used with other types of offline properties. Indeed, embodiments consistent with the present invention may be used with various types of online ads rendered with online properties. Thus, in the example described in FIG. 3, the document 320 might be a printed publication, a page of a printed publication, etc. The document 320 might have content 322 in addition to the one or more ads, but need not include content 322. In at least some embodiments consistent with the present invention, the document may be an online document, such as a Web page. In at least some embodiments consistent with the present invention, the ad(s) 324 is rendered on some other type of offline property (e.g., a billboard, a banner, etc.). In offline properties, the ad might be generated by printing means.

Although the example described above discussed a telephone number provided as a part of a URL, other voice-based device addressing might be used instead. For example, if the ad-associated telephone device 350 is a voice-over IP ("VoIP") device, it might be addressed using an IP address. Although the example described above discussed a URL, some other means for addressing and/or locating electronically accessible documents might be used.

Consider the URL:

http://www.googleads.com/1-800-123-4567

This URL might be an actual URL. That is, there might be a directory on a document (Web page) server named "1-800-123-4567." In at least some embodiments consistent with the present invention, there might be another directory that's named the same thing without the hyphens— "18001234567".

In at least some embodiments consistent with the present invention, suppose that all URLs begin with "http://www.googleads.com,". Further, suppose that all telephone numbers are the same—"1-800-4664531" ("1-800-GOOGLE1")—and only the extension changes per advertiser. Then, the URL displayed in the ad be even simpler:

http://www.googleads.com/1234 where 1234 is the extension only. Alternatively, an easy to remember telephone number can be displayed. In this case, the URL displayed in the ad could be:

http://www.googleads.com/1-800-GOOGLE1/1234

At least some embodiments consistent with the present invention might use a telephone number as a code (e.g., a coupon code) used to track conversions. This makes it easy for the user to remember (or jot down) the code, the user might be provided with an incentive (e.g., a discount) to use the code during a purchase, and the advertiser is provided with useful conversion information.

§4.4 CONCLUSIONS

Embodiments consistent with the present invention may offer one or more of the following advantages. Print ads can provide multiple ways for a user to interact with the advertiser. However, the user now only needs to remember or jot down one thing to be able to later interact with the advertiser via an ad-associated Web page and via an ad-associated telephone device. Indeed, if all ads always begin with the same prefix (e.g., "www.googleads.com"), the user need only remember or jot down the telephone number to distinguish one ad from another. Further, if all telephone numbers are the same and only the extension changes per advertiser, the user might only need to remember the extension if they already have remembered the telephone number.

What is claimed is:

1. A computer-implemented method comprising:
   a) providing, by a computer system including at least one computer, an advertiser user interface;
   b) receiving, by the computer system and via the advertiser user interface, a telephone number, ad creative information and ad landing page information;
   c) storing, by the computer system, an association of the received telephone number, ad creative information and ad landing page information, as advertisement information;
   d) accepting, by the computer system, a URL segment;
   e) generating, automatically by the computer system, a new URL including the URL segment and the stored telephone number;
   f) associating, by the computer system, the new URL with the stored advertisement information; and
   g) providing, by the computer system, the advertisement information such that an ad creative, including the ad creative information and the new URL, is rendered on a property.

2. The computer-implemented method of claim 1, wherein the new URL defines a location of a document associated with the advertisement information, the document including marketing information.

3. The computer-implemented method of claim 1, wherein the new URL defines a location of a document associated with the advertisement information for facilitating on-line commerce.

4. The computer-implemented method of claim 1, wherein the new URL defines a location of a document associated with the advertisement information, which may be loaded into a content rendering means, the computer-implemented method further comprising:
   h) tracking document loads.

5. The computer-implemented method of claim 4, further comprising:
   i) assessing a charge to an advertiser, associated with the advertisement information, for the document loads.

6. The computer-implemented method of claim 1, wherein the new URL defines a location of a document associated with the advertisement information for facilitating online purchases, the computer implemented method further comprising:
   h) tracking online purchases facilitated via the document.

7. The computer-implemented method of claim 6, further comprising:
   i) assessing a charge to an advertiser, associated with the advertisement information, for the online purchases facilitated via the document.

8. The computer-implemented method of claim 1, wherein the stored telephone number or an extension of the new URL is associated with a device or facility supporting telephone purchase orders.

9. The computer-implemented method of claim 1, wherein the stored telephone number or an extension of the new URL is associated with a device or facility supporting purchases via a telephone, the computer-implemented method further comprising:
  h) tracking telephone-based purchases facilitated by the device or facility.

10. The computer-implemented method of claim 9, further comprising:
  i) assessing a charge to an advertiser, associated with the advertisement, for the telephone-based purchases facilitated by the device or facility.

11. The computer-implemented method of claim 1, wherein the stored telephone number or an extension of the new URL is associated with a device or facility providing product or service information, or supporting purchases via a telephone, the computer-implemented method further comprising:
  h) tracking telephone calls to the stored telephone number or the extension.

12. The computer-implemented method of claim 11, further comprising:
  i) assessing a charge to an advertiser, associated with the advertisement information, for the telephone calls to the telephone number or extension.

13. The computer-implemented method of claim 1, wherein the property is an online property, and wherein the telephone number is associated with a voice-over IP telephone device.

14. The computer-implemented method of claim 1, wherein the property is an offline property.

15. The computer-implemented method of claim 1, wherein the property is a printed document.

16. Apparatus comprising:
  a) at least one processor;
  b) an input device; and
  c) at least one storage device storing a computer executable code which, when executed by the at least one processor, performs a method of
    1) providing an advertiser user interface,
    2) receiving, via the advertiser user interface, a telephone number, ad creative information and ad landing page information,
    3) storing an association of the received telephone number, ad creative information and ad landing page information, as advertisement information,
    4) accepting a URL segment,
    5) generating, automatically, a new URL including the URL segment and the stored telephone number,
    6) associating the new URL with the stored advertisement information, and
    7) providing the advertisement information such that an ad creative, including the ad creative information and the new URL, is rendered on a property.

17. The apparatus of claim 16, wherein the new URL defines a location of a document associated with the advertisement information, the document including marketing information.

18. The apparatus of claim 16, wherein the new URL defines a location of a document associated with the advertisement information for facilitating on-line commerce.

19. The apparatus of claim 16, wherein the stored telephone number or an extension of the new URL is associated with a device or facility supporting telephone purchase orders.

20. The computer-implemented method of claim 1 wherein the act of generating, automatically by the computer system, the new URL including the URL segment and the stored telephone number appends the stored telephone number to a predefined URL segment.

21. The computer-implemented method of claim 1 wherein the new URL is a single line URL, and wherein when the ad creative is rendered on a property, the new URL is rendered on a single line.

22. The apparatus of claim 16 wherein generating, automatically by the computer system, the new URL including the URL segment and the stored telephone number appends the stored telephone number to a predefined URL segment.

23. The apparatus of claim 16 wherein the new URL is a single line URL, and wherein when the ad creative is rendered on a property, the new URL is rendered on a single line.

* * * * *